US011655375B2

(12) United States Patent
Siripurapu et al.

(10) Patent No.: US 11,655,375 B2
(45) Date of Patent: *May 23, 2023

(54) CURABLE TWO-PART COATINGS FOR CONDUCTORS

(71) Applicants: GENERAL CABLE TECHNOLOGIES CORPORATION, Highland Heights, KY (US); NOVOTA INDUSTRIES, Mumbai (IN)

(72) Inventors: Srinivas Siripurapu, Carmel, IN (US); Vitthal Sawant, Thane (IN); Satish Narayan Patil, Mumbai (IN); Rajendra Yashwant Chaudhari, Thane (IN)

(73) Assignees: GENERAL CABLE TECHNOLOGIES CORPORATION, Highland Heights, KY (US); NOVOTA INDUSTRIES, Mumbai (IN)

( * ) Notice: Subject to any disclaimer, the term of this patent is extended or adjusted under 35 U.S.C. 154(b) by 364 days.

This patent is subject to a terminal disclaimer.

(21) Appl. No.: 14/735,794

(22) Filed: Jun. 10, 2015

(65) Prior Publication Data
US 2015/0353737 A1    Dec. 10, 2015

Related U.S. Application Data

(60) Provisional application No. 62/010,144, filed on Jun. 10, 2014.

(51) Int. Cl.
| | | |
|---|---|---|
| *H01B 13/06* | (2006.01) | |
| *C09D 1/02* | (2006.01) | |
| *H01B 3/10* | (2006.01) | |
| *H01B 3/00* | (2006.01) | |
| *H01B 7/29* | (2006.01) | |
| *C09K 5/14* | (2006.01) | |
| *C08K 3/22* | (2006.01) | |
| *C08K 3/34* | (2006.01) | |

(52) U.S. Cl.
CPC ............ *C09D 1/02* (2013.01); *C08K 3/22* (2013.01); *C08K 3/34* (2013.01); *C08K 3/346* (2013.01); *C09K 5/14* (2013.01); *H01B 3/006* (2013.01); *H01B 3/10* (2013.01); *H01B 7/29* (2013.01); *H01B 13/06* (2013.01); *C08K 2003/2227* (2013.01); *C08K 2003/2241* (2013.01)

(58) Field of Classification Search
USPC ......................................................... 427/157
See application file for complete search history.

(56) References Cited

U.S. PATENT DOCUMENTS

| | | | | |
|---|---|---|---|---|
| 3,895,956 A | 7/1975 | Yoshida et al. | | |
| 4,123,591 A * | 10/1978 | Karki | ..................... | C03C 17/25 |
| | | | | 106/626 |
| 4,288,252 A | 9/1981 | Neely | | |
| 4,318,743 A * | 3/1982 | Blasko | ..................... | C04B 28/26 |
| | | | | 106/600 |
| 4,347,285 A | 8/1982 | Batdorf | | |
| 5,164,003 A | 11/1992 | Bosco et al. | | |
| 5,194,087 A | 3/1993 | Berg | | |
| 5,885,658 A * | 3/1999 | Babel | ..................... | C23C 28/00 |
| | | | | 427/398.1 |
| 5,891,238 A * | 4/1999 | Griffith | ................. | C04B 14/303 |
| | | | | 106/286.2 |
| 6,428,616 B1 * | 8/2002 | Neely, Jr. | ................. | C03C 17/22 |
| | | | | 106/628 |
| 7,179,522 B2 * | 2/2007 | Hiel | ....... | H01B 5/105 |
| | | | | 174/102 R |
| 8,269,107 B2 | 9/2012 | Hills | | |
| 8,287,770 B2 | 10/2012 | Easter | | |
| 8,907,217 B2 | 12/2014 | Abu-Ali et al. | | |
| 2005/0051057 A1 * | 3/2005 | Evans | ................... | C04B 41/009 |
| | | | | 106/287.34 |
| 2005/0064094 A1 | 3/2005 | Wojtysiak et al. | | |
| 2005/0163983 A1 * | 7/2005 | Watase | ..................... | C09D 5/24 |
| | | | | 428/212 |
| 2005/0178000 A1 * | 8/2005 | McCullough | ........... | B21C 23/30 |
| | | | | 29/825 |
| 2006/0276780 A1 * | 12/2006 | Brace | ..................... | A61B 18/18 |
| | | | | 606/33 |
| 2010/0076719 A1 * | 3/2010 | Lawry | ................... | G01J 5/0003 |
| | | | | 702/136 |

(Continued)

FOREIGN PATENT DOCUMENTS

| | | |
|---|---|---|
| CN | 101646735 A | 2/2010 |
| JP | S47-26421 A | 10/1972 |

(Continued)

OTHER PUBLICATIONS

Thomas, Shane; International Search Report and Written Opinion of the International Searching Authority, issued in International Application No. PCT/US2015/035137; dated Sep. 4, 2015; 9 pages.
Murata, Austin; Notice of Allowance and Fee(s) Due, issued in corresponding U.S. Appl. No. 14/880,498; dated Mar. 7, 2016; 11 pages.
Murata, Austin; Non-Final Office Action issued in U.S. Appl. No. 14/880,498; dated Dec. 17, 2015; 17 pages.
James, Lloyd; Examination Report No. 1 issued in Australian Patent Application No. 2015274619; dated May 2, 2018; 4 pages.

(Continued)

*Primary Examiner* — Austin Murata
(74) *Attorney, Agent, or Firm* — Ulmer & Berne LLP (57) ABSTRACT

A compositional kit for forming a composition includes a first composition and a second composition which are separate. The first composition includes a filler, a cross-linking agent and an emissivity agent; and the second composition includes a silicate binder. Methods for making a compositional kit and for making a coated overhead conductor are also provided.

10 Claims, 5 Drawing Sheets

(56) References Cited

U.S. PATENT DOCUMENTS

| | | | |
|---|---|---|---|
| 2011/0042471 A1* | 2/2011 | Futaeda | F24D 3/18 236/51 |
| 2011/0100626 A1 | 5/2011 | Brenneis et al. | |
| 2012/0141778 A1 | 6/2012 | Phipps | |
| 2013/0112109 A1* | 5/2013 | Chen | C09D 7/1216 106/287.18 |
| 2014/0041925 A1* | 2/2014 | Davis | H01B 7/29 174/40 R |
| 2014/0230694 A1* | 8/2014 | Klamklang | C09D 7/61 106/286.4 |
| 2014/0329951 A1* | 11/2014 | Guo | C04B 28/26 524/417 |

FOREIGN PATENT DOCUMENTS

| | | |
|---|---|---|
| JP | S47-34626 A | 11/1972 |
| JP | S50-151221 A | 12/1975 |
| JP | S58-94499 A | 6/1983 |
| JP | S59-30865 A | 2/1984 |
| JP | H02-142859 A | 5/1990 |
| JP | 2000-325869 A | 11/2000 |
| JP | 2001-49147 A | 2/2001 |
| JP | 2004-2813 A | 1/2004 |
| JP | 2015-511642 A | 4/2015 |
| JP | 2015-528044 A | 9/2015 |
| JP | 2015-532763 A | 11/2015 |
| WO | 2008066319 A1 | 6/2008 |
| WO | WO 2013/097464 * | 7/2013 |

OTHER PUBLICATIONS

Dasilva, Luciana Souza; Office Action issued on Brazilian Patent Application No. 112016028974-9; dated Oct. 30, 2018; 8 pages including partial English translation.

Campos, Cecilia; Exam Report issued in Chilean Patent Application No. 2016-003174; dated Nov. 24, 2017; 10 pages, including partial English translation.

Song, Xue; First Office Action issued in Chinese Patent Application No. 201580041141.0; dated Apr. 18, 2018; 18 pages including English translation.

Campos Borda, Yenny Marcela; Office Action No. 4624 issued in Colombian Patent Application No. NC2016/0005055; dated Apr. 30, 2018; 21 pages including partial English translation.

Miehdaoui, Imed; Extended European search report, including the supplementary European search report and European search opinion, issued in European Patent Application No. 15805855.2; dated Dec. 5, 2017; 7 pages.

Mehdaoui, Imed; Examination Report, issued in European Patent Application No. 15805855.2; dated Sep. 4, 2018; 3 pages.

Mehdaoui, Imed; Examination Report, issued in European Patent Application No. 15805855.2; dated Feb. 13, 2019; 3 pages.

Al Mutairi, Sattam M.; Examination Report issued in GCC Application No. 2015-29522; dated Feb. 7, 2018; 4 pages.

Al Mutairi, Sattam M.; Examination Report issued in GCC Application No. 2015-29522; dated Aug. 7, 2018; 3 pages.

Al Mutairi, Sattam M.; Examination Report issued in GCC Application No. 2015-29522; dated Dec. 22, 2018; 3 pages.

Sharma, Dr. Jitender; First Examination Report issued in Indian Patent Application No. 201627039459; dated Dec. 21, 2018; 7 pages.

Sugano, Yoshio; Decision to Grant a Patent issued in Japanese Patent Application No. 2017-517204; dated Aug. 13, 2018; 5 pages including English machine translation.

Thai Patent Office; Office Action issued in Thai Patent Application No. 1601007334; dated Sep. 20, 2017; 3 pages including partial English translation.

Taiwan Patent Office; Office Action issued in Taiwan Patent Application No. 104118824; dated Jul. 5, 2018; 7 pages including English translation.

* cited by examiner

CURABLE TWO-PART COATINGS FOR CONDUCTORS

REFERENCE TO RELATED APPLICATION

The present application claims the priority of U.S. provisional application Ser. No. 62/010,144, entitled CURABLE TWO-PART COATINGS FOR CONDUCTORS, filed Jun. 10, 2014, and hereby incorporates the same application herein by reference in its entirety.

TECHNICAL FIELD

The present disclosure relates to a surface modified overhead conductor having a coating that allows the conductor to operate at lower temperatures.

BACKGROUND

As the need for electricity continues to grow, the need for higher capacity transmission and distribution lines grows as well. The amount of power a transmission line can deliver is dependent on the current-carrying capacity (ampacity) of the line. The ampacity of a line, however, is limited by the maximum safe operating temperature of the bare conductor that carries the current. Exceeding this temperature can result in damage to the conductor or to the transmission and distribution line accessories. The conductor temperature is determined by the cumulative effect of heating and cooling on the line. The conductor is heated by Ohmic losses and solar heat and cooled by conduction, convection and radiation. The amount of heat generated due to Ohmic losses depends on the current (I) and the electrical resistance (R) of the conductor and is determined by the relationship that Ohmic losses=$I^2R$. Electrical resistance (R) itself is further dependent on temperature. Higher current and temperature leads to higher electrical resistance, which, in turn, leads to greater electrical losses in the conductor.

Several solutions have been proposed in the art to create higher capacity transmission and distribution lines. For example, overhead conductors coated with spectrally selective surface coatings are known. Such coatings can have a coefficient of heat emission (E) higher than 0.7 and coefficient of solar absorption (A) that is less than 0.3. Such coatings can be white in color to lower solar absorption.

Overhead cables having a black paint coating with an emissivity greater than 0.6 are also known. Such paints can be made of a plastic (e.g. polyurethane) and black color pigment.

Electric conductors coated with a polymeric layer whose emissivity coefficient is 0.7 or more and solar absorption coefficient is 0.3 or less are also known. Such polymeric layer can be produced from polyvinylidene fluoride (PVDF) and a white pigment additive.

However, many of these known coatings are white coatings that are not desirable due to glare and discoloration which can occur over time. Furthermore, polymeric coatings are also not desirable due to their questionable heat and wet aging characteristics.

Heat protective coatings are also generally known. However, such coatings are used to protect a substrate from heat external to the substrate, and do not cool the substrate by radiating heat to the external environment.

Therefore, there remains a need for a durable, inorganic, coating for overhead conductors that allow the conductors to operate at reduced temperatures.

SUMMARY

In accordance with one embodiment, a method for making a compositional kit to form a curable coating composition comprises mixing a first composition and mixing a second composition, wherein the first composition and the second composition are separated. The first composition includes from about 2% to about 55% of a filler, by dry weight of the compositional kit, about 5% to about 20% of a cross-linking agent, by dry weight of the compositional kit, and about 6% to about 42% of an emissivity agent, by dry weight of the compositional kit. The second composition includes a metal silicate binder. The metal of the metal silicate binder is one of an alkali earth metal or an alkaline earth metal.

In accordance with another embodiment, a method for making an overhead conductor is provided. The method includes providing a composition kit by mixing a first composition and mixing a second composition, wherein the first composition and the second composition are separated; then mixing the first composition and the second composition together to form a coating composition, and then applying the coating composition on a surface of a bare conductor to form the overhead conductor. The first composition includes from about 2% to about 55% of a filler, by dry weight of the compositional kit, about 5% to about 20% of a cross-linking agent, by dry weight of the compositional kit, and about 6% to about 42% of an emissivity agent, by dry weight of the compositional kit. The second composition includes about 20% to about 65% of a metal silicate binder, by dry weight of the compositional kit. The metal of the metal silicate binder is one of an alkali earth metal or an alkaline earth metal.

DETAILED DESCRIPTION

The temperature of a conductor is dependent on a number of factors including the electrical properties of the conductor, the physical properties of the conductor, and the local weather conditions. For example, the temperature of a conductor can increase by absorbing heat from the sun due to solar radiation. The amount of heat absorbed is dependent on the surface of the conductor, that is, the surface's coefficient of absorptivity ("absorptivity"). A low absorptivity indicates that the conductor absorbs only a small amount of heat due to solar radiation.

A conductor can generally reduce its temperature by emitting heat through radiation. The amount of heat radiated is dependent on the conductor surface's coefficient of emissivity ("emissivity"). A high emissivity indicates that the conductor is radiating more heat than a conductor with a lower emissivity.

Accordingly, in certain embodiments, an overhead conductor that includes a heat radiating agent can, when tested in accordance to ANSI C119.4-2004, operate at a lower temperature than the temperature of the same conductor without the heat radiating agent. The heat radiating agent can be incorporated directly into the conductor or can be coated on the conductor. In one embodiment, the operating temperature can be reduced by about 5° C. or more.

Additionally, methods for coating an overhead conductor with an inorganic, non-white, flexible coating that reduces the operating temperature of the conductor compared to the temperature of the same conductor without the heat radiating agent are also described herein.

In certain embodiments, a coating layer placed on an overhead conductor can have other beneficial properties including improvement in one or more of the corrosion resistance of the conductor, the corona resistance of the conductor, the lifespan of the conductor, and a reduction in ice and dust on the conductor.

In certain embodiments, a two-part coating composition (also referred to herein as a compositional kit) can, when coated on an overhead conductor and tested in accordance to ANSI C119.4-2004, reduce the operating temperature of the conductor compared to the temperature of the same conductor without the heat radiating agent. In one embodiment, the operating temperature can be reduced by about 5° C., or more, when compared to the operating temperature of an uncoated overhead conductor, when the operating temperatures measured are about 60° C. or higher. In certain embodiments, the operating temperature can be reduced by about 10° C., or more, when compared to the operating temperature of an uncoated overhead conductor, when the operating temperatures measured are about 100° C. or higher. As can be appreciated, a reduction in operating temperature can allow for either thinner conductors to be utilized for a given current carrying capacity or for increased current carrying capacity to be used on traditionally sized conductors. For example, a cable coated with the two-part coating composition can operate at a lower temperature while conducting 1900 amps than a similar, uncoated, cable conducting only 1500 amps.

According to certain embodiments, a two-part coating composition or compositional kit can include a first composition part including a filler, a cross-linking agent (e.g., reactive agent), and an emissivity agent; and a second composition part including a silicate binder. The two-parts (e.g., the first and second composition parts) can be kept separate until use. The inventors have unexpectedly discovered that upon mixing of the two parts, the resulting coating composition can both begin to cure and exhibit an increase in viscosity over time. Without being bound by any particular theory, it is theorized that the curing occurs due to a reaction between the cross-linking agent and the silicate binder. As can be appreciated, as the viscosity increases, the ability of the coating composition to coat an overhead conductor becomes more difficult. As such, it can be advantageous to keep the two composition parts separate until use.

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium into account. Wet admixture refers to the coating composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

According to certain embodiments, a suitable filler for a first composition can be a metal oxide, including, but not limited to, quartz, aluminum oxide, mica, calcined kaolin, wallastonite, calcite, zirconia, zircon, micacious iron oxide, iron oxide, aluminum silicates, talc (sometimes referred to as hydrated magnesium silicate), barium sulphate, lithopone, and combinations thereof. In certain embodiments, more specific examples of a suitable filler can be selected from talc, calcined kaolin, aluminum oxide and/or quartz. In certain embodiments, a suitable filler can have an average particle size of about 50 microns or less, in certain embodiments, about 20 microns or less, and in certain embodiments, about 5 microns or less. The total amount of filler in a compositional kit can be about 2% to about 55%, in certain embodiments, about 10% to about 40%, and in certain embodiments about 15% to about 30%.

According to certain embodiments, a suitable cross-linking agent (e.g., reactive agent) can be a compound that when mixed with a binder, particularly in an aqueous slurry, can promote curing of the composition. Examples of suitable cross-linking agents can include, but are not limited to, magnesium hydroxide, magnesium oxide, zinc oxide, or combinations thereof. In certain embodiments, specific examples of a suitable cross-linking agent can include magnesium hydroxide and/or magnesium oxide. In certain embodiments, the total amount of cross-linking agent present in a compositional kit can vary from about 5% to about 20%, and in certain embodiments from about 7% to about 15%.

An emissivity agent can improve the ability of a composition to radiate heat from the overhead conductor. Examples of suitable emissivity agents can include, but is not limited to, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, chromium oxides, iron oxide, boron carbide, boron silicide, copper chromium oxide, titanium dioxide, aluminum nitride, boron nitride, alumina, and combinations thereof. In certain embodiments, specific examples of a suitable emissivity agent can be selected from boron oxide, cerium oxide, and/or titanium dioxide. In certain embodiments, the total amount of emissivity agent in a compositional kit can be about 6% to about 42%, in certain embodiments, about 10% to about 32%, and in certain embodiments, about 15% to about 28%.

A suitable silicate binder can be an alkali/alkaline earth metal silicate, such as, but not limited to, potassium silicate, sodium silicate, lithium silicate, calcium silicate, or combinations thereof. In certain embodiments, a silicate binder can also be aqueous colloidal silica. In certain embodiments, the binder can be potassium silicate. In certain embodiments, a suitable metal silicate can also be provided as an aqueous solution. As can be appreciated by one skilled in the art, a suitable aqueous solution, such as a solution formed of potassium silicate and potassium oxide, can have, for example, a metal oxide to silica ratio of about 1:1 to about 1:6 in certain embodiments, or a ratio of about 1:2 to about 1:4 in certain embodiments. The silicate binder can be present in a compositional kit at about 20% to about 65%, in certain embodiments at about 20% to about 50%, and in certain embodiments at about 25% to about 35%.

As can be appreciated, a compositional kit can additionally include other additives including one or more of a stabilizer, a defoamer, and an emulsifier. Such additives can be added to either the first compositional part or the second compositional part of the compositional kit. Examples of suitable stabilizers can include, but are not limited to, bentonite, kaolin, magnesium alumina silica clay, and stabilized zirconium oxide. Additionally, or alternatively, other ball clay stabilizers can also be included as a suitable stabilizer. In certain embodiments, the stabilizer can be bentonite. The stabilizer can be added at about 0.1% to about 2%.

A defoamer can be included to inhibit, or retard, the formation of foam when water is added to a dry composition. Suitable examples of defoamers can include silicon-based antifoam agents and non-silicon-based antifoam agents. Certain surfactants can also be used as a defoamer. Examples of such surfactants can include, but are not limited to, cationic, anionic, or non-ionic surfactants, and fatty acid salts. A defoamer can be added at about 0.2% to about 1.5%.

An emulsifier can be included to maintain an even dispersion when water is added to a dry composition. Suitable examples of emulsifiers can include sodium lauryl sulfate, sodium dodecyl phenylsulfonate, potassium stearate, sodium dioctyl sulfosuccinate, dodecyl diphenyloxy disulphonate, ammonium nonyl phenoxyethyl poly(l) ethoxyethyl sulfate, sodium styryl sulfonate, sodium dodecyl allyl sulfosuccinate, linseed oil fatty acid, sodium or ammonium salt of ethoxylated nonylphenol phosphate, sodium octoxynol-3-sulfonate, sodium coconut creatinate, sodium 1-alkoxy-2-hydroxypropyl sulfonate, sodium α-olefin($C_{14}$-$C_{16}$)sulfonate, hydroxyl alkanol sulfate, tetra sodium N-(1, 2-dicarboxylethyl)-N-octadecyl sulfosalicyloyl amine salt, N-octadecyl sulfosalicyloyl amino-acid disodium salt, disodium alkylamido polyethoxy sulfosuccinate, disodium ethoxylated nonylphenol sulfosuccinate half ester, sodium ethoxyethyl sulfate. The amount of the emulsifier used can be about 2% to about 3%.

A compositional kit can additionally include a plasticizer to improve the flexibility of the coating layer after application to a substrate. Suitable examples of a plasticizer include one or more of glycerol, sugar, and cellulose.

In certain embodiments, the first composition part can include about 1% to about 18% talc, about 1% to about 15% calcined kaolin, about 0% to about 10% aluminum oxide, about 0% to about 12% quartz, about 5% to about 20% magnesium hydroxide and/or magnesium oxide, about 1-12% boron oxide, silicon carbide, and cerium oxide, and about 5% to about 30% titanium dioxide; and the second part contains about 20% to about 65% potassium silicate.

As can be appreciated, the first and second compositional parts can be mixed separately and can be kept separated until just prior to use. The components of the first compositional part can be mixed and stored dry or wet. When wet, the dispersion medium can be water. The resulting first compositional part, as a wet mixture, can be a suspension with a total solid content of about 30% to about 55%, in certain embodiments about 35% to about 50%, and in certain embodiments about 43% to about 50%. Organic dispersants can also be used as the dispersion medium. Suitable examples of such organic dispersants can include, but are not limited to, alcohols, ketones, esters, hydrocarbons, and combinations thereof. In certain embodiments, the organic dispersants can be water miscible. A wet second compositional part can similarly be prepared. The second compositional part, as a wet mixture, can be a suspension with a total solid content of about 20% to about 50%, in certain embodiments, about 25% to about 45%, and in certain embodiments about 30% to about 38%. The two-parts of the compositional kit, whether dry or wet, should not come into contact when stored. The compositional kit can begin to cure as soon as the two compositional parts are mixed. As a result of the curing process, the viscosity of the coating composition can increase with time. Because high viscosity adversely affects the coating composition as it is coated onto the bare conductor, the mixing of the first and second parts (compositions) can be delayed until just before application.

Upon mixing of the two compositional parts, the coating composition can be used to coat a bare conductor. In certain embodiments, the coating composition can be used within about 24 hours after mixing, in certain embodiments within about 12 hours, and in certain embodiments within about 8 hours. Upon mixing of the two parts in a wet mixture, the viscosity of the wet mixture can be from about 10 seconds to about 30 seconds, in certain embodiments from about 13 seconds to about 25 seconds, and in certain embodiments from about 15 seconds to about 20 seconds as measured by using a B4 Ford cup in accordance to ASTM D1200 (2010). Additionally, the viscosity of the wet mixture can increase no more than 65% within about 8 hours of mixing the first and second compositional parts together. The wet mixture can be prepared in a High Speed Disperser ("HSD"), Ball Mill, Bead mill or using other techniques known in the art. As illustration, a HSD can be used to make the coating composition be slowly added together the first and second composition parts and mixing until the desired dispersion of the components is achieved. In certain embodiments, the mixer speed can be about 10 rpm or more to achieve the desired coating composition.

Once applied and cured on a conductor, the coating can offer a flexible coating that shows no visible cracks when bent on a mandrel of diameter of about 5 inches or less. In certain embodiments, the flexible coating can show no visible cracks when bent on mandrel diameters ranging from 0.5 inch to 5 inches. The cured coating can also be heat resistant and can pass the same mandrel bend test after heat aging at 90° C. for 7 days. The cured coating can also be exterior weather resistant and can pass the same mandrel bend test after 4,000 hours of exposure to exterior weathering condition (e.g. a combination of UV light, water spray, and heat application).

A coating can be applied around a variety of cables including high voltage overhead electricity transmission lines. As can be appreciated, such overhead electricity transmission lines can be formed in a variety of configurations and can generally include a core formed from a plurality of conductive wires. For example, aluminum conductor steel reinforced ("ACSR") cables, aluminum conductor steel supported ("ACSS") cables, aluminum conductor composite core ("ACCC") cables and all aluminum alloy conductor ("AAAC") cables. ACSR cables are high-strength stranded conductors and include outer conductive strands, and supportive center strands. The outer conductive strands can be formed from high-purity aluminum alloys having a high conductivity and low weight. The center supportive strands can be steel and can have the strength required to support the more ductile outer conductive strands. ACSR cables can have an overall high tensile strength. ACSS cables are concentric-lay-stranded cables and include a central core of steel around which is stranded one, or more, layers of aluminum, or aluminum alloy, wires. ACCC cables, in contrast, are reinforced by a central core formed from one, or more, of carbon, glass fiber, aluminum oxide fiber or polymer materials. A composite core can offer a variety of advantages over an all-aluminum or steel-reinforced conventional cable as the composite core's combination of high tensile strength and low thermal sag enables longer spans. ACCC cables can enable new lines to be built with fewer supporting structures. AAAC cables are made with aluminum or aluminum alloy wires. AAAC cables can have a better corrosion resistance, due to the fact that they are largely, or completely, aluminum. ACSR, ACSS, ACCC, and AAAC cables can be used as overhead cables for overhead distribution and transmission lines.

As can be appreciated, a cable can also be a gap conductor. A gap conductor can be a cable formed of trapezoidal shaped temperature resistant aluminum zirconium wires surrounding a high strength steel core.

FIGS. 1, 2, 3, and 4 each illustrate various bare overhead conductors according to certain embodiments. Overhead conductors 100, 200, 300 and 400 can generally include only one or more conductive wires 210 and 410 like in FIGS. 2 and 4, or conductive wires 120, 210, 320 and 410 surrounding the cores 110 and 310 like in FIGS. 1 and 3. Each overhead conductor depicted in FIGS. 1-4 can include a coating (130, 220, 330 and 420) formed from the two compositional parts. Additionally, FIGS. 1 and 3 can, in certain embodiments, be formed as ACSR cables through selection of steel for the core and aluminum for the conductive wires. Likewise, FIGS. 2 and 4 can, in certain embodiments, be formed as AAAC cables through appropriate selection of aluminum or aluminum alloy for the conductive wires.

In alternate embodiments the cores 110, 310 can be steel, invar steel, composite materials, any other material that can provide strength to the conductor. In other alternate embodiments the conductive wires 120, 210, 320, 410 can be made of any suitable conductive material including copper, a copper alloy, aluminum, an aluminum alloy, including aluminum types 1350, 6000 series alloy aluminum, aluminum-zirconium alloy, carbon nanotube, grapheme, or any other conductive material.

Composite core conductors are useful due to having lower sag at higher operating temperatures and their higher strength to weight ratio. Composite materials are based on glass fiber, carbon fiber, polymeric fibers, aluminum oxide fiber reinforced in aluminum or any other material that can provide strength and lower sag to the conductor. A polymeric coating can also, or alternatively, be utilized in composite core conductor designs. As can be appreciated, a composite core conductor with the coating formed from a compositional kit can have a further reduction in conductor operating temperatures due to the coating and can have both a lower sag and lower degradation of certain polymer resins in the composite from the lowered operating temperatures. Non-limiting examples of composite cores can be found in U.S. Pat. Nos. 7,015,395, 7,438,971, 7,752,754, U.S. Patent App. No. 2012/0186851, U.S. Pat. Nos. 8,371,028, 7,683,262, and U.S. Patent App. No. 2012/0261158, each of which are incorporated herein by reference.

In certain embodiments, the surface of the overhead conductor can be prepared prior to the application of the coating composition. The preparation process can include one or more of chemical treatment, pressurized air cleaning, hot water or steam cleaning, brush cleaning, heat treatment, sand blasting, ultrasound, deglaring, solvent wipe, plasma treatment, and the like. In certain processes, the surface of the overhead conductor can be deglared by sand blasting.

According to certain embodiments, a coating composition can be applied by spray gun at about 10 psi to about 45 psi pressure using controlled air pressure. In such embodiments, the spray gun nozzle can be placed perpendicular to the direction of the conductor (e.g., an approximately 90° angle) to get a uniform coating on conductor product. In certain cases, two or more guns can also be used to get more efficient coatings. The coating thickness and density are controlled by the admixture viscosity, gun pressure, and conductor line speed. During the coating application, the overhead conductor temperature can be maintained between 10° C. to 90° C. depending on the material of the conductor.

Alternatively, in certain embodiments, a coating composition can be applied to an overhead conductor by one or more of dipping, a brush, or by roller. For example, in a dipping process, a cleaned and dried conductor can be dipped into a coating composition to allow the coating composition to completely coat the conductor. The conductor can then be removed from the coating composition and allowed to dry.

After application of the coating, the coating on the overhead conductor can be allowed to cure/dry by evaporation either at room temperature or at elevated temperatures. In certain embodiments, a coating can be dried by oven heating. In certain such embodiments, the oven can be about 325° C., in certain embodiments from about 200° C. to about 250° C. In certain embodiments, a coating can also, or alternatively, be subjected to direct flame exposure which exposes the coating to intense heating. For example, in certain embodiments, direct flame can be applied for about 0.1 seconds to about 60 seconds, and in certain embodiments from about 0.5 seconds to about 30 seconds. In yet a further embodiment, the cable can be oven heated, followed by direct flame exposure. Here, the two heating processes can take place: continuously online, i.e, the cable can exit the oven and can then lead directly to the flame or, alternatively, can take place in a batch manner. For example, after oven heating, a cable can be wound on to a bobbin, which can then be transferred to a flaming apparatus where the cable is unwound from the bobbin and run through a flame to further cure/dry the coating. In certain embodiments, after being oven and flame heated, a cable can be would on a bobbin which can be further heated in an oven. In such embodiments, the oven can be about 200° C. to about 325° C. in certain embodiments, and at about 200° C. to about 250° C. in certain embodiments. The bobbin can be heated in the oven for about 0.1 hour to about 24 hours in certain embodiments, and for about 1 hour to about 15 hours, in certain embodiments.

As can be appreciated, a coating can also be applied to conductors which are already installed and are currently in use. Existing conductors can be coated with a robotic system for automated or semi-automated coating. The automated system functions in three steps: (1) cleaning the conductor surface; (2) applying the coating on the conductor surface; and (3) drying the coating.

Additionally, a coating can be applied to overhead transmission line accessories. For example, a substation can include a variety of accessories that generate heat including a breaker and a transformer such as a current coupling transformer. The coating described herein can be applied to one or more of these accessories to reduce the operating temperature of the coated accessory compared to a similar, but uncoated, accessory. As can be appreciated, additional transmission line accessories can also benefit from such a coating including, as non-limiting examples, deadends/termination products, splices/joints, suspension and support products, motion control/vibration products (sometimes referred to as dampers), guying products, wildlife protection and deterrent products, conductor and compression fitting repair parts, substation products, clamps, and corona rings. A coating can be applied to such accessories in any suitable manner. For example, a coating can be applied to a new accessory after cleaning the accessory's surface. Alternatively, a coating can also be applied to an existing accessory after cleaning the accessory's surface. In each such embodiment, the coating can be dried and cured by exposure to ambient temperatures or elevated temperatures provided by, for example, a direct flame.

A coating can be applied to a conductor in several ways. For example, a coating can be applied by coating the individual wires before their assembly in the bare overhead conductor. As can be appreciated, it is possible to coat all of the wires of the conductor, or, more economically, coat only the outer most wires of a conductor. Alternatively, a coating can be applied only to the outer surface of the bare overhead conductor instead of the individual wires. In certain embodiments, the complete outer surface of a bare conductor can be coated. In other embodiments, only a portion of the bare conductor can be coated.

Figure 1:
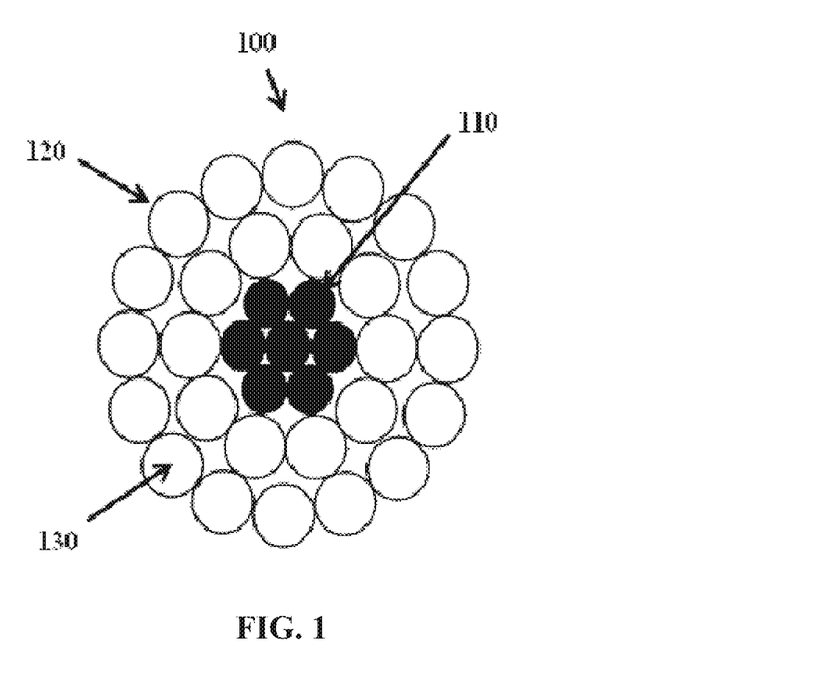
FIG. 1 depicts a cross-sectional view of a bare conductor having a plurality of core wires according to one embodiment.
Figure 2:
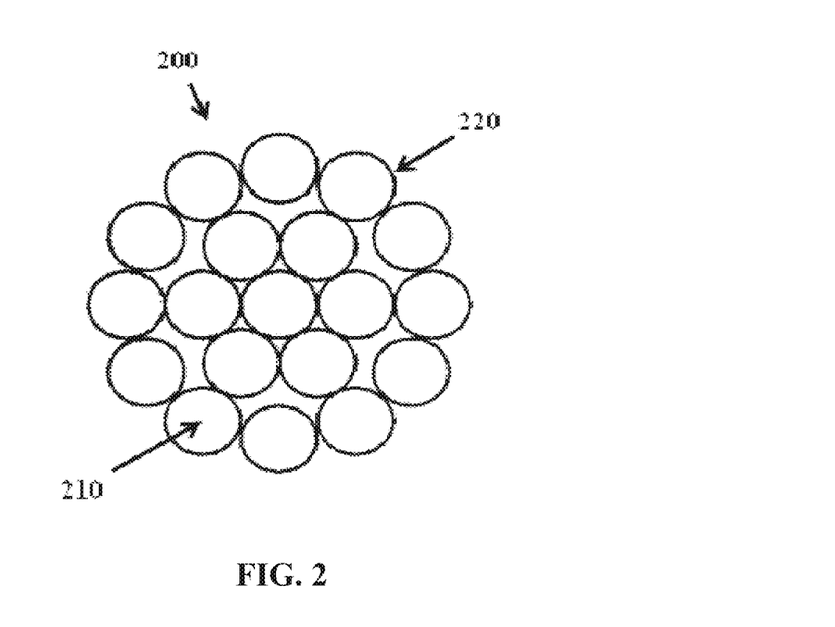
FIG. 2 depicts a cross-sectional view of a bare conductor without core wires according to one embodiment.
Figure 3:
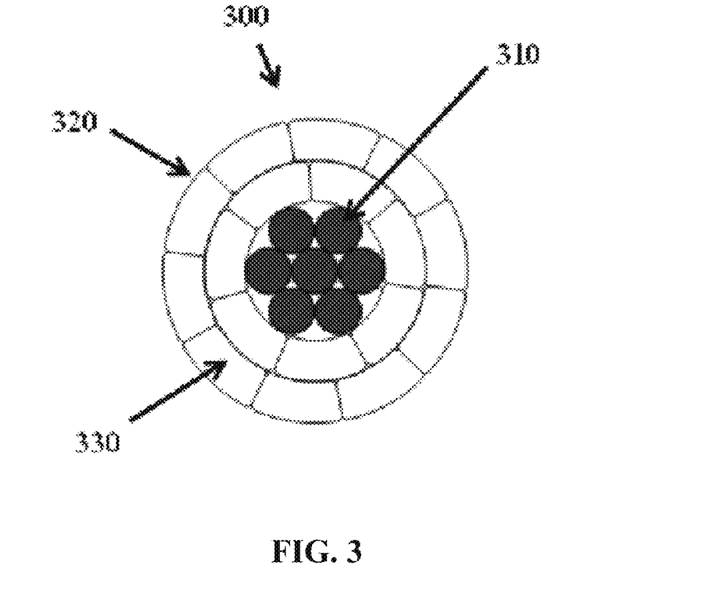
FIG. 3 depicts a cross-sectional view of a bare conductor formed of trapezoidal shaped conductive wires and having a plurality of core wires according to one embodiment.
Figure 4:
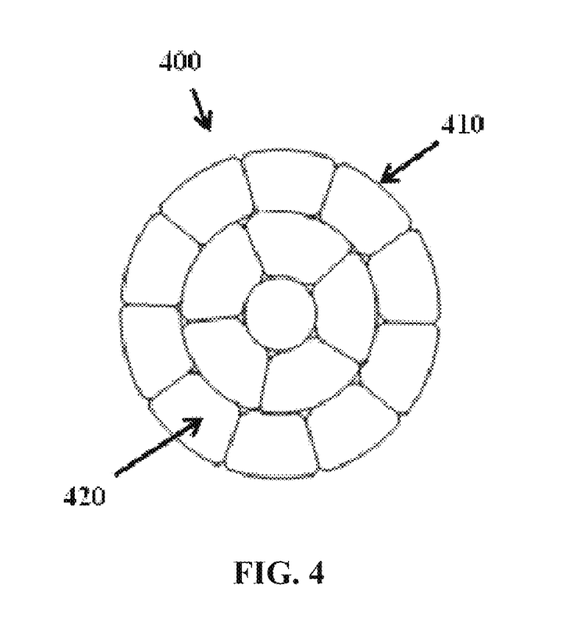
FIG. 4 depicts a cross-sectional view of a bare conductor formed from trapezoidal shaped conductive wires and without core wires according to one embodiment.
Figure 5:
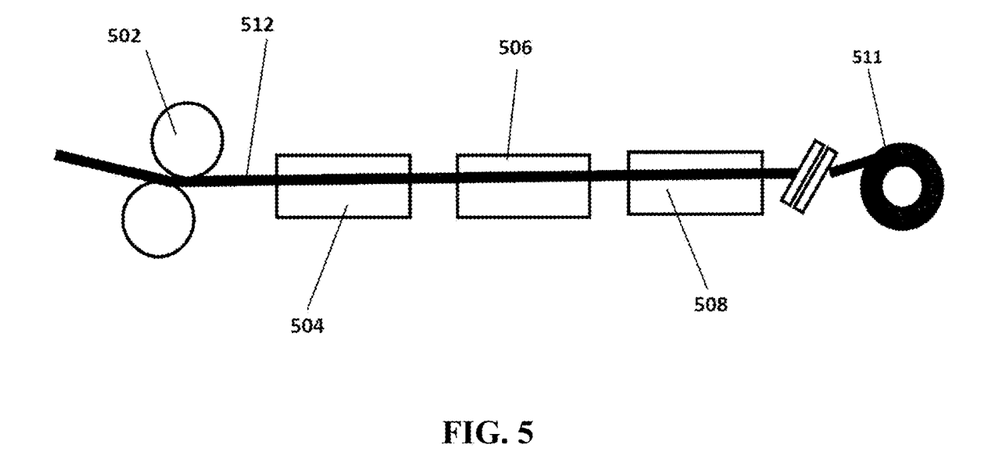
FIG. 5 depicts a continuous coating process for a conductor according to one embodiment.

As can be appreciated, a coating can be applied in a batch process, a semi-batch process, or a continuous process. FIG. 5 illustrates a continuous coating process and depicts a conductor 512 passing from an intake winding roll 502 to a pretreatment unit 504 and coating unit 506. The pretreatment unit 504 prepares the surface of the conductor for application of the coating in the coating unit 506. After the coating is applied, the conductor can be dried via a drying/curing unit 508. Once dried, the cable can be wound on a roller 511.

In the pretreatment unit 504, the surface of the conductor 512 can be prepared by media blasting. Such media can include sand, glass beads, ilmenite, steel shot, and other suitable media. The media blasting can be followed by air-wiping to blow the particulate materials off the conductor 512. An air-wipe uses jets to blow air on to the conductor 512 at an angle and in a direction opposing the direction of travel of the conductor 112. The air jets create a 360° ring of air that attaches to the circumference of the conductor 512 and wipes the surface with the high velocity of air. In such an example, as the conductor exits the pretreatment unit 504, any particles adhered to the conductor 512 can be wiped and blown back into the pretreatment unit 504. A suitable air jet can operate at about 60 to about 100 PSI, in certain embodiments, at about 70 PSI to about 90 PSI in certain embodiments, and at about 80 PSI in certain embodiments. The air jet can have a velocity (coming out of the nozzles) of about 125 mph to about 500 mph in certain embodiments, about 150 mph to about 400 mph in certain embodiments, and about 250 mph to about 350 mph in certain embodiments. After the air-wipe, the number of particles that are greater than about 10 microns in size remaining on the surface of the conductor can be about 1,000 particles per square feet, or less, in certain embodiments, or about 100 particles per square feet, or less, in certain embodiments. After the air wipe, the conductor can be heated, e.g. by a heating oven, UV, IR, E-beam, induction heating, pressurized steam heating, open flame, and the like. The heating can be accomplished by single or multiple units. In one embodiment, the direct flame application can be used for preheating the conductor. Here, the cable can be passed directly through a flame to heat the cable surface to a temperature above ambient temperature. A high heating temperature in pretreatment can allow for a lower heating temperature to be utilized in the drying/curing unit. However, heating should not be too severe that it affects the quality of the coating (e.g. through adherence, evenness, blistering etc). In certain embodiments, the conductor 512 should not be heated above about 140° C., and in certain embodiments to no more than about 120° C.

Figure 6:
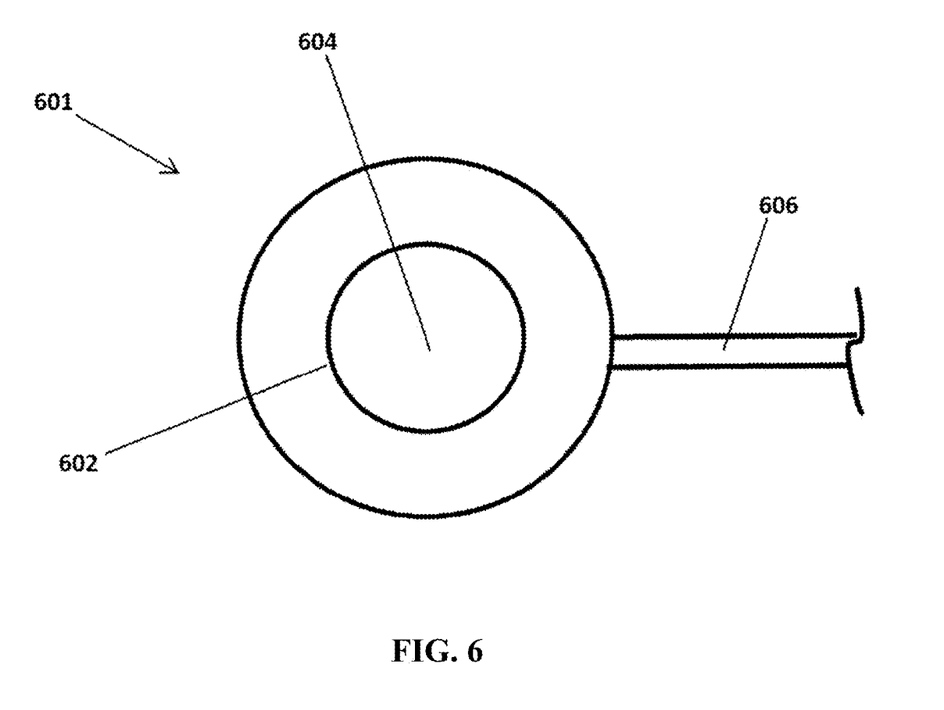
FIG. 6 depicts a cross-sectional view of a flooded die according to one embodiment.
Figure 7:
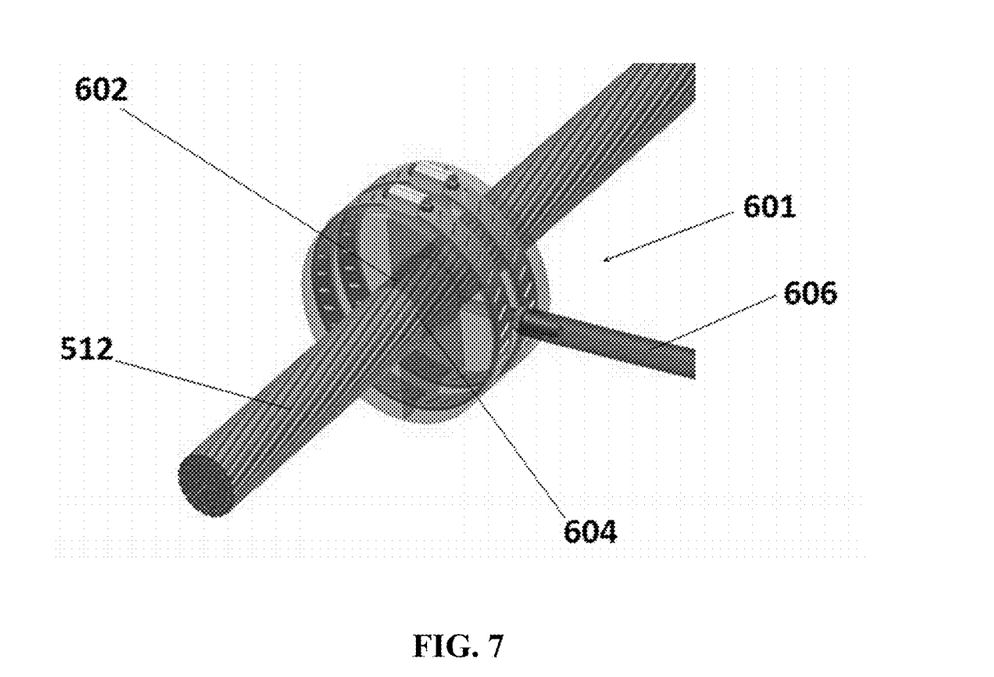
FIG. 7 depicts a perspective view of the flooded die of FIG. 6.
Figure 8:
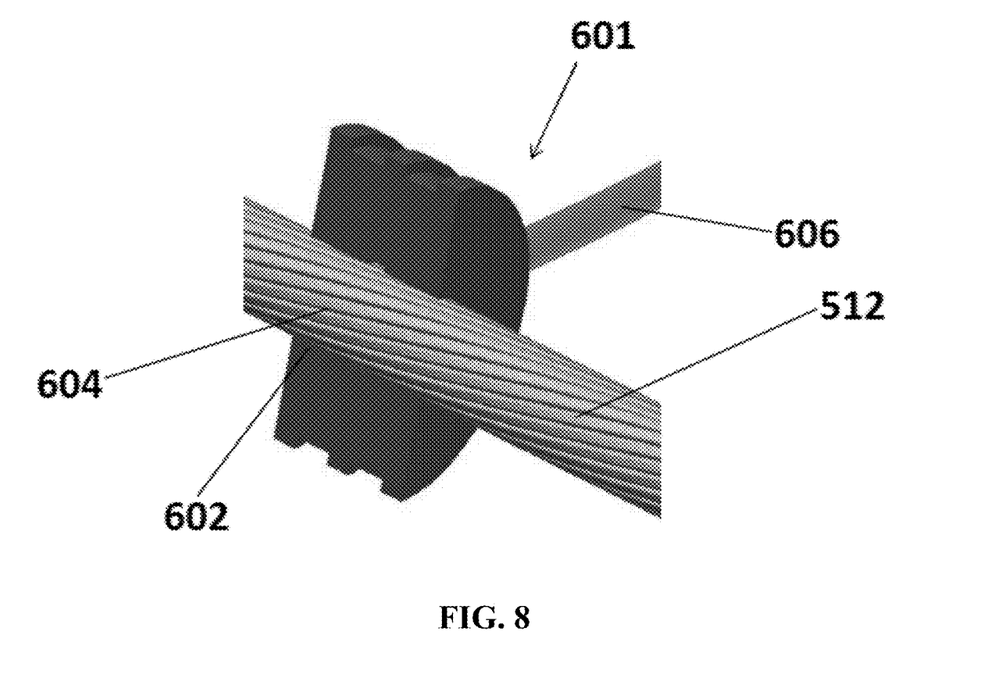
FIG. 8 depicts a cut-away view of the flooded die of FIG. 6.

Once the surface of the conductor 512 is prepared, it can be ready for coating. The coating process can take place in the coating unit where the cable passes through a flooded die that deposits a liquid suspension of the coating composition onto the prepared surface. FIGS. 6 to 8 depict an annular shaped flooded die 601. The coating suspension can be fed to the die 601 via a tube 606. As the conductor 512 passes though the center opening 604 of the flooded die 601, the coating composition coats the conductor 512 via one or more opening ports 602 in the inner surface of the die 601. In certain embodiments, the flooded die 601 can include two or more, four or more, or six or more, opening ports 602 evenly spaced around the circumference of the inner surface. Once the conductor 512 exits the flooded die, the conductor 512 can pass through another air wipe to remove excess coating suspension and to spread the coating composition evenly around the conductor. In the case of a stranded conductor, the air wipe can allow the coating to penetrate the grooves between the strands on the surface of the conductor. This air wipe can operate using similar conditions as the air wipe in the pretreatment unit 504.

Once the conductor 512 is coated, it can pass through the drying/curing unit 508, as depicted in FIG. 5. Drying/curing can be accomplished by using air or heated air. For example, suitable air can be heated to about 1000° C. in certain embodiments and the drying/curing unit can operate with a line speed from about 9 feet/min to about 500 feet/min in certain embodiments, and a line speed of about 10 feet/min to about 400 feet/min in certain embodiments. The temperature of the air and the line speed can be selected based on the metal alloy used in the conductor 512. The drying process can be a gradual drying process, a rapid drying process, and/or a direct flame application process. As can be appreciated, drying or curing can also be accomplished by other techniques, including the use of one or more of a heating oven, UV radiation, IR radiation, E-beam curing, induction heating, chemical application, carbon dioxide gas or liquid spray and the like. The drying process can occur in a single unit or occur in multiple units. It can also be vertical or horizontal or occur at a specific angle. In certain embodiments, the drying/curing can occur by heating, followed by direct flame application. For example, a cable can first pass through a heating oven, and then directly through a flame to heat the cable surface to a temperature of about 150° C. or less, and in certain embodiments, to a temperature of about 120° C. or less. Once dried or cured, the coated conductor can be wound on a roller 511 for storage.

The continuous process, if operated for an individual strand (instead of a stranded cable), can operate at a line speed of about 2500 ft/min or less in certain embodiments, from about 9 ft/min to about 2000 ft/min in certain embodiments, from about 10 ft/min to about 500 ft/min in certain embodiments, and from about 30 ft/min to about 300 ft/min in certain embodiments.

Once coated onto a conductor 512 and dried/cured, the coating layer can be less than about 100 microns in certain embodiments, and in certain embodiments about 10-30 microns. The coatings produced can be non-white having a L value of about 20 or more. The coatings can be electrically non-conductive, semi-conductive, or conductive.

The coated conductor can exhibit improved heat dissipation. Emissivity is the relative power of a surface to emit heat by radiation, and the ratio of the radiant energy emitted by a surface to the radiant energy emitted by a blackbody at the same temperature. Emittance is the energy radiated by the surface of a body per unit area. Emissivity can be measured, for example, by the method disclosed in U.S. Patent Application Publication No. 2010/0076719 to Lawry et al., which is incorporated herein by reference. The coated conductor can have an emissivity coefficient of about 0.3 or more in certain embodiments, in certain embodiments, about 0.5 or more, and in certain embodiments about 0.75 or more.

Without further description, it is believed that one of ordinary skill in the art can, using the preceding description and the following illustrative examples, make and utilize the compositions and methods of the present disclosure. The following examples are given to illustrate the present disclosure and claimed invention. It should be understood that the disclosure and claimed invention is not to be limited to the specific conditions or details described in those examples.

EXAMPLES

Testing Procedures
Viscosity:
Viscosity of the compositions were measured using B4 ford cup viscometers in accordance to ASTM D 1200 (2010).

Tape Adhesion:
Tape adhesion tests were performed on coated aluminum strip in accordance to ASTM D 3359 (2009).

Coating Applicability:
To determine coating applicability, two coating defects, pinhole defects and dry spot defects, were evaluated on coated samples. The number of these defects per square centimeter of coated strip was determined. Six or more coating defects per square centimeter indicated "poor" applicability; two to five defects per square centimeter indicated "medium" applicability; and one or no defects indicated "good" applicability. Compositions having "medium" or "good" applicability were considered acceptable for coating purposes.

Mandrel Bend Test:
The flexibility of the coating was tested using the Mandrel Bend test. In the Mandrel Bend test, coated samples are bent on different cylindrical mandrels sizes (from larger diameter to small diameter) to observe the coatings for any visible cracks. The presence of visible cracks indicates failure of the sample.

Heat Aging:
To study thermal stability of the coating, coated samples were placed in an air circulation oven at a temperature of 90° C. for a period of 7 days. After the thermal aging was complete, the samples were placed at room temperature for a period of 24 hrs. The samples were then bent on different cylindrical mandrels sizes (from larger diameter to small diameter) and inspected for any visible cracks at each of the mandrel sizes.

Water Aging Test:
To study the hot water stability of the coating, coated samples were aged in a hot water bath maintained at 90° C. for 7 days. After the aging process was complete, the samples were removed and allowed to stand at room temperature for a period of 24 hours before testing. The aged samples were then tested by bending the samples on a series of mandrels of decreasing cylindrical size and inspected for any visible cracks at each of the mandrel sizes. The samples were also weighed before and after aging to determine any weight gain/loss from the boiling water aging.

Temperature Reduction:
Testing was conducted to measure the effectiveness of the coating to reduce operating temperature of conductor samples in accordance with the Current Cycle Test Method, ANSI C119.4-2004, except that the test was performed for a reduced number of heat cycles (at least fifty cycles were performed). An experimental set-up is prepared as depicted in FIG. 9 and is described below.

Figure 9:
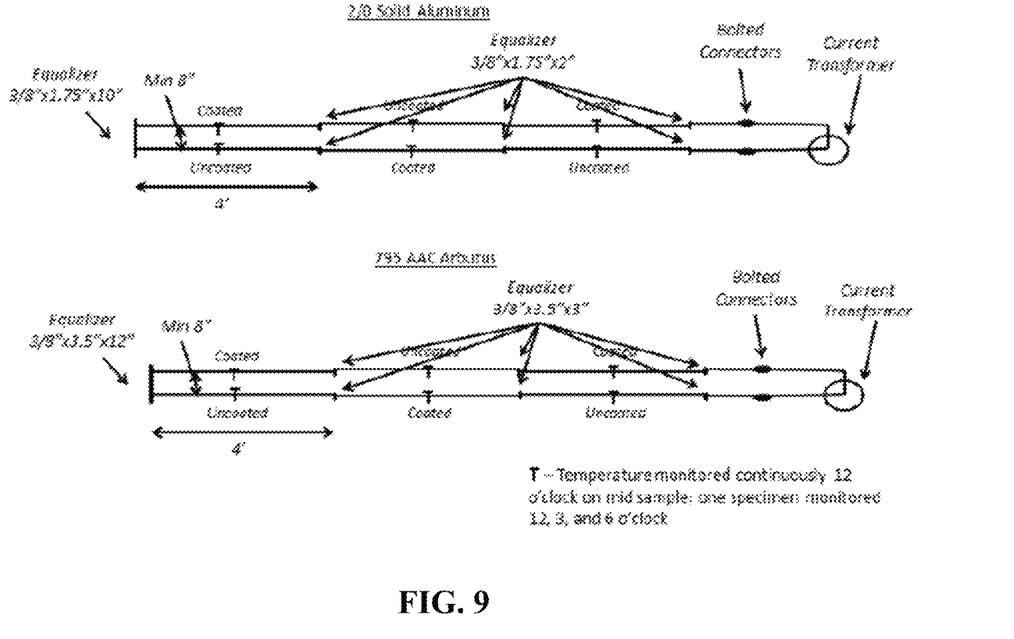
FIG. 9 depicts a test arrangement used to measure the temperature of metal substrates for a given applied current.

As depicted in FIG. 9, a series loop was formed with six identically sized four foot conductor specimens (three uncoated and three coated), and an additional suitable conductor routed through the current transformer. The series loop consisted of two runs of three identically sized conductor specimens. The bare and coated conductor specimens were welded in an alternating fashion. An equalizer was installed between conductor specimens to provide equipotential planes for resistance measurements. The equalizers ensured permanent contacts between all conductor strands. Equalizers (2"×⅜"×1.75" for 2/0 solid aluminium and 3"×⅜"×3.5" for 795 AAC Arbutus) were fabricated from aluminium bus. Holes in a size of the connecting conductor were drilled into the equalizers. Ends of the adjacent conductors were welded to the equalizers to complete the series loop. A larger equalizer (10"×⅜"×1.75" for 2/0 solid aluminium and 12"×⅜"×3.5" for 795 AAC Arbutus) was used at one end to connect the two runs, while the other end was connected to an additional conductor routed through the current transformer.

Emissivity and Solar Absorptivity:
Emissivity and solar absorptivity of the coated and uncoated samples were measured in accordance to ASTM E408 (2013) and ASTM E903 (2012), respectively.

Weathering Test:
Samples were weathered in accordance to ASTM G155-05a (2013) by placing the samples in a chamber and cycling the exposed samples to light, moisture, and heat. Each cycle was 120 minutes and included 102 minutes of light from a daylight filtered xenon-arc lamp at 63° C., and 18 minutes of light and water spray. Samples were exposed for up to 10,000 hours and removed every 2,000 hours for testing.

Salt Spray Test:
Salt spray testing was performed in accordance to ASTM 5 117-11/ISO-10289. One foot samples of ASCR conductor were used. The samples were exposed to a salt solution of 5% NaCl in a salt spray chamber and observed daily for the appearance of rust, corrosion, or any other visible change.

Examples

Three (3) coating compositions were produced and tested for viscosity, coating applicability, and tape adhesion. Details of the three coating compositions (Comparative Example 1 and Inventive Examples 1 and 2) are provided on a dry weight basis and listed in Table 1. Test results are also provided for each of Comparative Example 1 and Inventive Examples 1 and 2 and reported in Table 1.

TABLE 1

Details of three coating compositions.

| Components | Supplier/Grade | Comparative Example 1 | Inventive Example 1 | Inventive Example 2 |
|---|---|---|---|---|
| Part 1 | | | | |
| Titanium dioxide | Du Pont/Ti-Pure R-706 grade | 12.5 | 12.5 | 12.5 |
| Magnesium oxide | Yogi Dyechem Industries, India | 0 | 15 | 7.5 |
| Calcined kaolin | 20 Microns, India/Glazex grade | 5 | 5 | 5 |
| Talc | 20 Microns, India/AR grade | 2 | 2 | 2 |
| Boron Carbide | Boron Carbide, India/Vajrabor grade | 3 | 3 | 3 |
| Quartz powder | Dinesh Minerals (P) Ltd, India | 17.5 | 2.5 | 30 |
| Part 2 | | | | |
| Potassium silicate | Noble Alchem, India | 60 | 60 | 40 |
| Total | | 100 | 100 | 100 |
| Properties | | | | |
| Viscosity B4 Ford cup (Sec) | | 17 | 18 | 15 |
| Coating applicability | | Poor | Good | Medium |
| Tape adhesion | | Poor | Medium | Medium |

The viscosity of Inventive Example 1 was tested over time after the two parts were mixed together. The increased viscosity over time is shown in Table 2.

TABLE 2

Viscosity increase with time for Inventive Example 1.

| TIME (hours) | Viscosity (B4 Ford Cup) | Bend test (½" mandrel size) | Boiling water test | Coating applicability |
|---|---|---|---|---|
| 0 | 18 sec | passes | passes | Good |
| 2 | 21 sec | passes | passes | Good |
| 4 | 21 sec | passes | passes | Good |
| 6 | 24 sec | passes | passes | Good |
| 8 | 28 sec | passes | passes | Good |
| 10 | 30 sec | fails | — | Medium |
| 17 | 55 sec | fails | — | Medium |

Inventive Example 1 was used as a coating composition for overhead conductor cables. The cables were evaluated for various properties including temperature reduction, emissivity, and solar absorptivity. The test results comparing the coated and uncoated substrates are presented in Table 3.

TABLE 3

Comparison of properties for coated and uncoated samples.

| | Uncoated Sample | Coated Sample (using Inventive Example 1) |
|---|---|---|
| Temperature (95 A at 15 min.) (° C.) for 2/0 solid aluminum | 102.3 | 84.3 |
| Temperature Reduction (%) | N/A | −17.6 |
| Salt Spray (after 1,500 hours) | N/A | No rust, flaking, chipping of sample observed |
| Emissivity | 0.16 | 0.86 |
| Solar Absorptivity | 0.29 | 0.55 |

Inventive Example 1 was also used to prepare additional samples for evaluation with the Mandrel Bend test. Test results comparing a coated sample and an uncoated sample are depicted in Table 4. Passing results on the Mandrel Bend test means that no flaking, damage, or removal of the coating was observed.

TABLE 4

Mandrel Bend test before and after aging

| | Uncoated Sample | Coated Sample (Using Inventive Example 1) |
|---|---|---|
| No aging | N/A | Passed ½" Mandrel Bend test |
| Heat aging (90° C. for 7 days) | N/A | Passed ½" Mandrel Bend test |
| Weathering test (after 10,000 hours) | N/A | Passed ½" Mandrel Bend test |
| Water aging (90° C. for 7 days) | N/A | Passed 1" Mandrel Bend test with less than a 1% weight increase |

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A method for making a compositional kit, the method comprising:
  a. mixing a first composition comprising from about 2% to about 55% of a filler, by dry weight of the compositional kit, wherein the filler comprises about 1% to about 18% talc and about 1% to about 15% calcined kaolin; about 5% to about 20% of a cross-linking agent, by dry weight of the compositional kit, wherein the crosslinking agent comprises one or more of magnesium hydroxide and magnesium oxide; and an emissivity agent, the emissivity agent comprising one or more of gallium oxide, cerium oxide, zirconium oxide, silicon hexaboride, carbon tetraboride, silicon tetraboride, silicon carbide, molybdenum disilicide, tungsten disilicide, zirconium diboride, cupric chromite, boron carbide, boron silicide, copper chromium oxide, aluminum nitride, boron oxide, titanium dioxide, and magnesium oxide, wherein the emissivity agent comprises about 1% to about 12% of one or more of boron carbide, boron oxide, silicon carbide, and cerium oxide; and about 5% to about 30% titanium dioxide, and wherein the first composition is free of a metal silicate binder; and
  b. mixing a second composition comprising a metal silicate binder, wherein the metal silicate binder comprises about 20% to about 65% potassium silicate; and
  c. maintaining separation between the first composition and the second composition so as to prevent premature curing resulting from a reaction between the crosslinking agent of the first composition and the metal silicate binder of the second composition.

2. A method for making a compositional kit to form a curable coating composition, the method comprising:
  a. mixing a first composition comprising from about 2% to about 55% of a filler, by dry weight of the compositional kit, wherein the filler comprises about 1% to about 18% talc and about 1% to about 15% calcined kaolin; about 5% to about 20% of a cross-linking agent, by dry weight of the compositional kit, wherein the crosslinking agent comprises one or more of magnesium hydroxide and magnesium oxide; and an emissivity agent, wherein the emissivity agent comprises about 1% to about 12% of one or more of boron carbide, boron oxide, silicon carbide, and cerium oxide; and about 5% to about 30% titanium dioxide; and
  b. mixing a second composition comprising a metal silicate binder, wherein the metal silicate binder comprises about 20% to about 65% potassium silicate; and
  wherein the first composition and the second composition are separated.

3. The method of claim 2, wherein the filler has an average particle size of about 50 microns or less and further comprises one or more of quartz, aluminum oxide, mica, wallastonite, calcite, zirconia, zircon, micacious iron oxide, iron oxide, aluminum silicates, barium sulphate, and lithopone.

4. The method of claim 2, wherein the crosslinking agent further comprises zinc oxide.

5. The method of claim 2, wherein the first composition further comprises additional emissivity agents, wherein the additional emissivity agents comprise one or more of zinc oxide, silicon dioxide, manganese oxide, chromium oxide, iron oxide, titanium dioxide, boron nitride, and alumina.

6. The method of claim 2, wherein the second composition comprises about 20% to about 65% of the metal silicate binder, by dry weight of the compositional kit; and wherein the metal silicate binder further comprises one or more of sodium silicate, lithium silicate, calcium silicate, and magnesium aluminum silicate.

7. The method of claim 2, wherein
  about 0% to about 10% aluminum oxide and about 2.5% to about 30% quartz.

8. The method of claim 2, wherein at least one of the first composition and the second composition further comprises one or more of a stabilizer, an emulsifier, and a defoamer.

9. The method of claim 2, further comprising the addition of water to at least one of the first composition and the second composition and mixing the water to form a wet admixture.

10. The method of claim 9, wherein water is added to the first composition and the second composition and wherein the first composition has a total solids content range of about 30% to about 55% and the second composition has a total solids content range of about 20% to about 50%.

* * * * *

UNITED STATES PATENT AND TRADEMARK OFFICE
CERTIFICATE OF CORRECTION

| | |
|---|---|
| PATENT NO. | : 11,655,375 B2 |
| APPLICATION NO. | : 14/735794 |
| DATED | : May 23, 2023 |
| INVENTOR(S) | : Srinivas Siripurapu et al. |

It is certified that error appears in the above-identified patent and that said Letters Patent is hereby corrected as shown below:

In the Claims

Column 16, Claim 7, Line 32, change "about 0% to about 10% aluminum oxide" to --the filler further comprises about 0% to about 10% aluminum oxide--.

Signed and Sealed this
Seventeenth Day of October, 2023

Katherine Kelly Vidal
*Director of the United States Patent and Trademark Office*